UNITED STATES PATENT OFFICE.

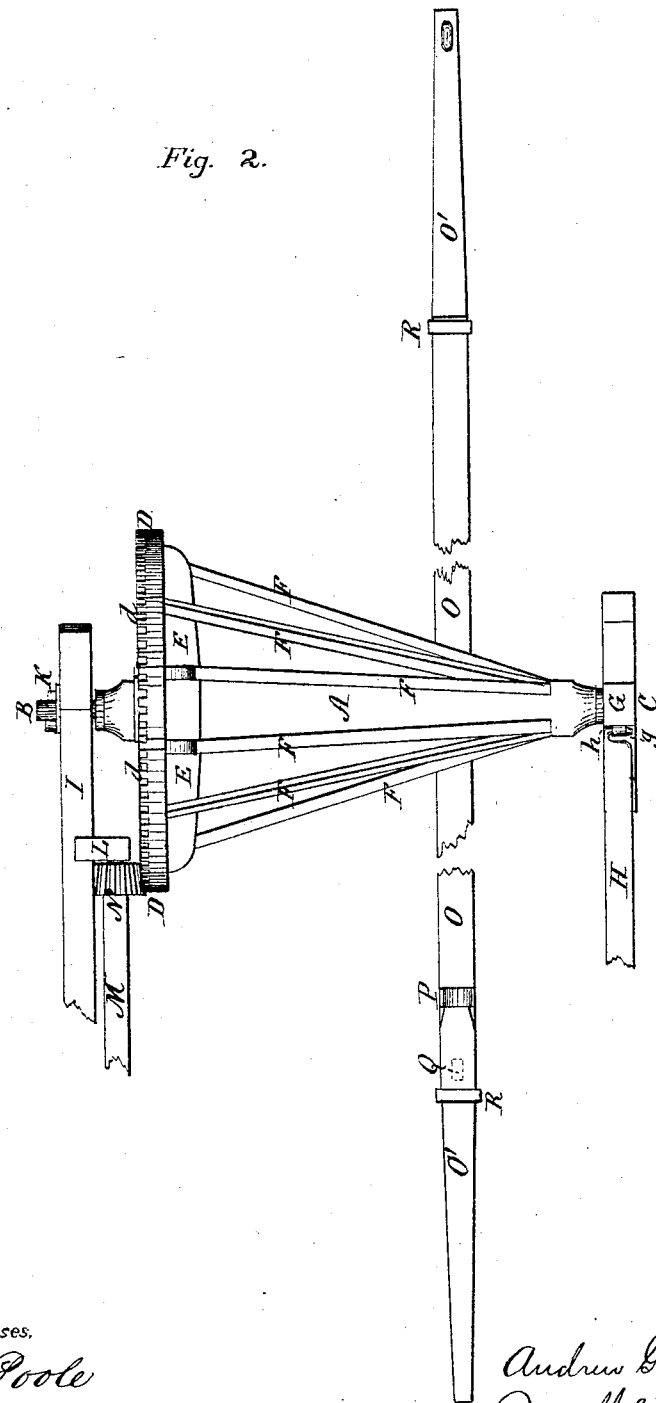

ANDREW G. HAGERSTROM, OF RED WING, MINNESOTA.

IMPROVEMENT IN HORSE-POWERS.

Specification forming part of Letters Patent No. 135,331, dated January 28, 1873.

*To all whom it may concern:*

Be it known that I, ANDREW G. HAGERSTROM, of Red Wing, in the county of Goodhue, and in the State of Minnesota, have invented certain new and useful Improvements in Horse-Powers; and do hereby declare that the following is a full, clear, and exact description thereof, reference being had to the accompanying drawing making a part of this specification, in which—

Figure 1:
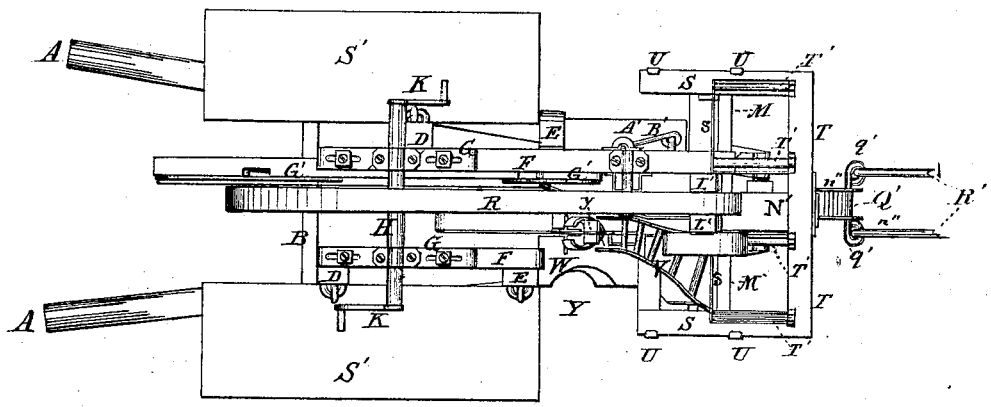
Figure 2:
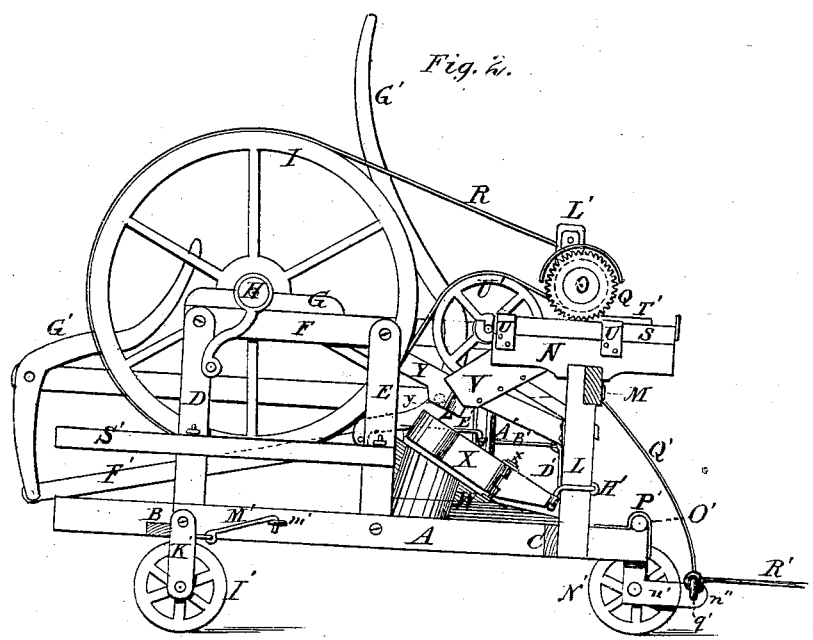

Figure 1 is a plan view of the upper side of my device, and Fig. 2 is a side elevation of the same.

Letters of like name and kind refer to like parts in each of the figures.

The design of my invention is to increase the strength, durability, and efficiency of horse-powers; and to this end it consists, principally, in the peculiar construction of the extension levers or bars employed for connecting horses to or with the machine, substantially as and for the purpose hereinafter shown. It consists, further, in the device as a whole, when its several parts are constructed and combined substantially as and for the purpose hereinafter set forth.

In the annexed drawing, A represents the main or driving-shaft, provided upon its ends with suitable journals B and C, and having, preferably, a rectangular form in cross-section immediately below its upper end. Secured to or upon the upper portion of the shaft A, a short distance below the journal B, is a bevel-gear wheel, D, the spokes or arms E of which are so combined as to form at their center a rectangular opening that corresponds in size and shape to the corresponding features of the contiguous portion of said shaft which it embraces. From equidistant points within the periphery of the gear-wheel D a number of braces, F, extend downward and inward, and are united to the shaft A near its lower end. The object of these braces is to sustain the gear-wheel in position at a right angle to the line of the shaft and prevent the downward pressure of the pinion from throwing said gear-wheel out of engagement therewith. The shaft A has its lower end journaled within a suitable step, G, which is held in position with relation to the machinery to be driven by means of two bars, H, that are provided at their ends with hooks $h$, which fit into corresponding staples $g$ upon the side of said step. From the step G the bars H extend outward in diverging lines, and at their outer ends are connected to or with the frame of the driven machine in any suitable manner. The upper end of the shaft A is journaled within the crossed ends of two bars, I, which from thence extend horizontally outward and apart, and are secured at their opposite ends to or upon the frame of the machine to be driven. A suitable slot extending horizontally through the journal B, just above the upper surface of the bars I, receives a key, K, which prevents said bars from becoming accidentally displaced. Secured upon the lower sides of the bars I, just within the line, vertically, of the teeth $d$ of the gear-wheel D, is a cross-bar, L, which receives the journaled end of a shaft, M, used for transmitting motion from the shaft A to the machinery to be driven. A pinion, N, secured upon the shaft M, immediately outside of the cross-bar L and engaging with the gear-wheel D, receives motion from the latter and communicates the same to said shaft. The levers or bars O, used for attaching horses to the device, pass horizontally through the center of the shaft A, and extend radially outward to equal distances from the same. In order that the length of said bars or levers may be increased when desired, an extra bar, O', is secured upon the end of each in the following manner: A metal band or staple, P, secured upon the rear side of each lever, O, at a short distance from its end, corresponds to and receives the reduced inner end of the bar O', and confines the same closely against said lever O. A short metal tongue, Q, extending rearward from near the end of the lever O, fits into a corresponding groove cut in the forward face of the bar O', and insures the vertical position of the latter. For convenience when the bar O' is not in use, the tongue Q is so pivoted as to enable it to be shut entirely into the bar O.

2 Sheets--Sheet 1.

A. G. HAGERSTROM.
Machines for Sawing and Splitting Wood.

No. 135,332. Patented Jan. 28, 1873.

Witnesses.
C. H. Poole
John R. Young

Inventor,
A. G. Hagerstrom, by
Prindle and Co., his Attys